United States Patent [19]

Robyn et al.

[11] Patent Number: 5,229,337
[45] Date of Patent: Jul. 20, 1993

[54] COMPOSITION OF MATTER FOR USE IN A PROCESS OF FORMING A POROUS REFRACTORY MASS

[75] Inventors: Pierre Robyn, Nivelles, Belgium; Léon-Philippe Mottet, Medina, Ohio; Alexandre Zivkovic, Uccle, Belgium

[73] Assignee: Glaverbel, Brussels, Belgium

[21] Appl. No.: 748,825

[22] Filed: Aug. 22, 1991

Related U.S. Application Data

[62] Division of Ser. No. 543,107, Jun. 25, 1990, Pat. No. 5,061,526.

Foreign Application Priority Data

Jun. 30, 1989 [LU] Luxembourg ............................ 87550

[51] Int. Cl.$^5$ .................................................. C04B 38/08
[52] U.S. Cl. .................................. 501/80; 501/128; 501/133
[58] Field of Search ................ 501/80, 99, 100, 84, 501/128, 133

[56] References Cited

U.S. PATENT DOCUMENTS

| | | | |
|---|---|---|---|
| 3,804,642 | 4/1974 | Rumbold et al. | 106/38.27 |
| 3,810,768 | 5/1974 | Parsons et al. | 106/56 |
| 3,811,898 | 5/1976 | Rumbold et al. | 106/38.27 |
| 3,888,691 | 6/1975 | Villani et al. | 106/40 R |
| 3,923,531 | 12/1975 | Parsons et al. | 106/56 |
| 4,058,485 | 11/1977 | Cheung | 428/550 X |
| 4,076,221 | 2/1978 | Gröger | 266/44 |
| 4,306,030 | 12/1981 | Watanabe et al. | 501/99 |
| 4,585,485 | 4/1986 | Shikano et al. | 501/100 X |
| 4,623,131 | 11/1986 | Roberts | 266/280 |
| 4,627,945 | 12/1986 | Winkelbauer et al. | 501/100 X |
| 4,814,300 | 3/1989 | Helferich | 501/84 |
| 4,920,084 | 4/1990 | Robyn et al. | 501/94 |
| 4,988,647 | 1/1991 | Mottet et al. | 501/100 X |
| 5,002,805 | 3/1991 | Robyn et al. | 427/309 |
| 5,002,910 | 3/1991 | Robyn | 501/103 |

FOREIGN PATENT DOCUMENTS

| | | |
|---|---|---|
| 0244133 | 11/1987 | European Pat. Off. . |
| 0274286 | 7/1988 | European Pat. Off. . |
| 2057787 | 10/1971 | Fed. Rep. of Germany . |
| 2318123 | 2/1977 | France . |
| 84/00747 | 3/1984 | PCT Int'l Appl. . |
| 354249 | 10/1972 | U.S.S.R. . |
| 979511 | 12/1982 | U.S.S.R. . |
| 1320198 | 6/1987 | U.S.S.R. . |
| 1293524 | 10/1972 | United Kingdom . |
| 1330894 | 9/1973 | United Kingdom . |
| 1556993 | 12/1979 | United Kingdom . |
| 2155852 | 10/1985 | United Kingdom . |
| 2170122 | 7/1986 | United Kingdom . |
| 2170191 | 7/1986 | United Kingdom . |
| 2177082 | 1/1987 | United Kingdom . |
| 2190671 | 11/1987 | United Kingdom . |

OTHER PUBLICATIONS

World Patents Index Accession No. 74-35724V (week 7419), Derwent Pub. Ltd., and JP-B-49015699, H. Ichikawa, Apr. 17, 1974.

*Chemical Abstracts*, vol. 107, No. 10, Sep. 1987, Ashpin et al., "Method For Producing Hot Guniting Mixture", p. 309, Ref. No. 82749r.

*Chemical Abstracts*, vol. 106, No. 12, Mar. 1987, Uchida et al., "Melt-Spray Refractory Compositions For Metal-Refining Furnace", p. 294, Ref. No. 89216c.

*Primary Examiner*—Karl Group
*Attorney, Agent, or Firm*—Spencer, Frank & Schneider

[57] ABSTRACT

A composition of matter which is a powder mixture for use in a process of forming a porous refractory mass on a surface, the composition including refractory particles, fuel particles which are capable or reacting exothermically with an oxidizing gas to forming at least one refractory oxide and which are present in a quantity effective to release, on projection together with the oxidizing gas, sufficient heat to melt at least the surfaces of the refractory particles so that the refractory particles and at least some of the at least one refractory oxide bond together; and particles of porosity-inducing material comprised of at least one of hollow and porous particles which become incorporated in the refractory mass formed on projection and which have at least one of a composition and a particle size selected so that incorporation of the porosity-inducing material in the powder mixture results in the formation of porosity within the refractory mass formed on projection.

14 Claims, No Drawings

COMPOSITION OF MATTER FOR USE IN A PROCESS OF FORMING A POROUS REFRACTORY MASS

This is a division of application Ser. No. 07/543,107 filed Jun. 25, 1990, now U.S. Pat. No. 5,061,526.

BACKGROUND OF THE INVENTION

1. Field of the Invention.

This invention relates to a process of forming a porous refractory mass and to a composition of matter for use in such a process.

Such a process is useful for the formation or repair of a thermally insulating lining or cladding on a surface such as the surface of a refractory wall of a furnace or other structure which will be exposed to high temperatures in use. Examples of such structures are glass-making furnaces, cracking furnaces as used in the oil industry, coke ovens and refractory equipment employed in metallurgy.

2. Description of the Related Art.

To form a thermally insulating refractory mass or lining on a surface such as, for example, a refractory wall, the common practice is to face that surface with porous, and therefore insulating, refractory material, for example in the form of bricks or small slabs. This operation is carried out with cold bricks and it implies the possibility of access by the brick-layer to the surface on which the mass is to be formed. An operation of this type cannot therefore be carried out in a hot location such as, for example, on a wall of a furnace at operating temperature. It will be appreciated that cooling of a furnace or other structure from its operating temperature to enable such re-bricking to take place, and subsequent reheating would subject the furnace to such thermal stresses that significant further damage could be caused and the furnace might well be in worse state after re-bricking than before. Such cooling and reheating would also add significantly to the time needed for carrying out the re-bricking, and cool re-bricking is accordingly an entirely unsatisfactory process, unless the furnace is, in effect, being rebuilt.

While it would in theory be possible to use a hot re-bricking technique in order to cut down the repair time, this would also give rise to problems which are in practice insurmountable. Remote handling equipment would be required for positioning the bricks or slabs and for cementing them in position. There is no such equipment in existence which is capable of working at many locations within large refractory structures. Even at relatively accessible locations hot re-bricking would be unsatisfactory because the refractory cement would not give a satisfactory bond between the new bricks themselves, or between the new bricks and the existing hot refractory structure, even if the new bricks were to have been preheated.

Of course there are known processes for effecting the hot repair of refractory structures. Probably the most commercially successful of such processes is one which has become known as "ceramic welding". Examples of such ceramic welding processes are described in Glaverbel's British Patents Nos GB 1,330,894 and GB 2,170,191. In the ceramic welding process, a refractory mass is formed on a surface by projecting against that surface, in the presence of oxygen, a ceramic welding powder which comprises a mixture of refractory particles and fuel particles: the fuel particles are of such a composition and size that they react exothermically with oxygen, forming a refractory oxide and releasing the heat needed to melt, at least superficially, the projected refractory particles so that the refractory particles and combustion product(s) cohere into a refractory mass. Aluminium and silicon are examples of suitable fuels. It is known that silicon ought, strictly speaking, to be categorized as a semimetal, but since silicon behaves like some metals (it is capable of undergoing a highly exothermic oxidation to form a refractory oxide), for reasons of convenience these fuel elements are often referred to as metallic. It is generally recommended to project the ceramic welding powder mixture in the presence of a high concentration of oxygen, for example by using oxygen of commercial grade as carrier gas. A coherent refractory mass is thus formed, which can adhere to the surface against which the particles are projected. The exothermic reaction zone of the ceramic welding process can reach very high temperatures which make it possible to burn through any slag which may be present on the target surface and to soften or to melt that surface. A good joint is thus produced between the surface which is treated and the newly formed refractory mass.

This ceramic welding process can be used to form a refractory element, for example a block of special shape. However, it is most commonly employed for forming linings or performing repairs on blocks or walls. It is particularly useful for repairing or strengthening existing refractory structures by the in situ formation of a high quality compact and coherent refractory weld mass. It is quite commonplace to carry out this operation when the base refractory is hot and, in some cases, it is even possible to perform this repair or this strengthening without the need to stop the operation of the device. Indeed, in general, the hotter the target refractory surface, the more efficient is the ceramic welding process and the better is the bond between the weld mass formed and the pre-existing refractory structure.

The ceramic welding process owes much of its success to the fact that a major proportion of the combustion of the fuel particles takes place against the target surface. Thus the maximum amount of heat is available actually at the working site, so that the target refractory becomes softened there where it is contacted by molten or semi-molten refractory material which is either projected as such or results from combustion of the fuel. As a consequence of this, molten or semi-molten material impacting against the target surface adheres strongly to that surface and a dense coherent refractory weld mass is built up. It will be seen therefore that such a process is entirely unsuitable for the formation of a porous lining or repair.

There are other hot repair processes which are known and which have been used commercially. For example flame spraying processes are known in which a stream of refractory particles is projected from a burner nozzle in a combustible carrier gas, such as coal gas, which is mixed with oxygen at the burner outlet to form a flame which heats the refractory particles as they travel to the target surface. However such processes do not heat the refractory particles strongly enough for a satisfactory bond to be formed between the particles inter se or between the particles and the target surface. As a result, the refractory deposit formed has rather low resistance to abrasion.

Other processes for the repair of hot refractory structures which have been proposed include wet-gunniting and the plastering on of grog in a binder material. Again, such processes result in the formation of a repair mass which is only weakly bonded to the pre-existing structure, and such deposits can accordingly flake off rather easily.

Industry is accordingly faced with the problem of forming or repairing a porous thermally insulating refractory lining or wall while the lining or wall is hot, and in such manner as to preserve or afford good thermally insulating qualities.

SUMMARY OF THE INVENTION

It is a principal object of this invention to alleviate that problem.

According to the present invention, there is provided a process of forming a porous refractory mass on a surface, characterized in that an oxidizing gas is projected against that surface together with a powder mixture which comprises: refractory particles; particles of fuel which reacts exothermically with the oxidizing gas to form refractory oxide and release sufficient heat to melt at least the surfaces of the refractory particles so that they bond together to form the refractory mass; and particles of material whose composition and/or size is selected so that the incorporation of such material in the projected mixture results in the formation of porosity within the refractory mass formed.

The invention also provides a composition of matter for use in such a process. Such a composition of matter is characterized in that it is a powder mixture which comprises: refractory particles; particles of fuel which is capable of reacting exothermically with oxygen to form refractory oxide and is present in such proportion as to release, on projection together with oxidizing gas, sufficient heat to melt at least the surfaces of the refractory particles so that they bond together to form a refractory mass; and particles of material whose composition and/or size is selected so that the incorporation of such material in the mixture results in the formation of porosity within the refractory mass formed on such projection.

Such a process and powder composition are useful for forming high quality porous refractory masses for the repair of existing thermally insulating refractory pieces while those pieces are hot. They are also useful for the de novo formation of high quality thermally insulating refractory linings or cladding on existing hot refractory structures.

It will be seen that the process is one which makes use of a ceramic welding powder to which has been added particulate porosity-inducing material. The use, and indeed, the effectiveness of such a process and powder is surprising.

It will be recalled that previously known ceramic welding processes owe their commercial success to the fact that a dense coherent refractory weld mass is built up when the ceramic welding powder used is projected from a lance against the target surface, and that such weld mass adheres strongly to that surface. The foremost preoccupation of the ceramic welder was therefore to form a weld mass of as low porosity as possible in order to promote adhesion of the resulting weld mass to the surface being treated and to promote cohesiveness in the weld mass and thus good abrasion resistance and thermo-chemical resistance. The deliberate introduction into a ceramic welding powder of material which would cause porosity in the resulting refractory weld mass thus goes against all conventional wisdom in the ceramic welding art.

It was known that if the temperature of the ceramic welding reaction was too low as a result of poor control of the various parameters of the reaction, a non-uniform and uncontrolled porosity could be formed in the resulting deposit. However such porosity was inevitably accompanied by an insufficient internal coherence of the resulting refractory deposit, poor resistance to abrasion or to corrosion, and poor adherence to the treated surface. Any such porous deposits would have become detached after the furnace had been operating for a while and the repair would have had to be done again. In brief, ceramic welders would do their utmost to avoid operating in that way. The deliberate formation of a porous mass using a technique of this type is therefore in itself surprising.

Various kinds of porosity-inducing material may be used. That material may be such as to burn to evolve gaseous combustion products, it may decompose to gaseous decomposition products, or it may itself be porous or hollow. It is also most surprising that a significant degree of porosity can be induced into the resulting refractory mass since, given the very high temperature released by the exothermic reaction when the latter is well controlled, it would be expected that the gas which may be present or formed under the effect of heat would escape without being occluded in the mass which is formed and that any porosity initially formed in the resulting mass would collapse due to the impact of further projected material before the mass had solidified sufficiently to retain such pores, with the result that there would be formed a more or less compact mass. It is even more surprising that the degree of porosity formed in the resulting weld mass can be controlled, so that a given degree of porosity can be reliably reproduced, and that it is possible to obtain a refractory mass which is at the same time porous and which firmly adheres to the surface receiving the projected mixture.

The process and powder according to the invention are thus highly advantageous, owing to the fact that they easily permit the formation of a porous, and therefore insulating, refractory mass in situ on a given surface. Moreover, they offer the advantage of simplicity in execution using an apparatus of traditional type, such as that employed in the conventional ceramic welding processes referred to above. The invention consequently also makes it possible to form an insulating refractory mass with controlled porosity in places to which access is difficult and with little or no interruption of the operation of the furnace on which the work is carried out.

The fuel comprises particles of at least one element capable of forming a refractory oxide by being oxidized. In this way, a mass which is compatible with the surface onto which the projection takes place can easily be obtained, since in most cases the surface involved is that of a refractory wall. The fuel and the refractory particles of the mixture can, for example, easily be chosen so that the resulting weld mass comprising the projected refractory particles and the combustion products of the fuel has substantially the same composition as the refractory surface against which the mixture is projected.

In some preferred embodiments of the invention, such porosity-inducing material comprises particles of a material which burns to yield gaseous combustion products which becomes incorporated in the resulting refractory mass. The use of a material which can burn to yield gaseous combustion products which become incorporated in the refractory mass formed on such projection is highly advantageous because these particles can release or supply many times their volume of gas, and this makes it possible to introduce large quantities of gas to form pores by starting with a very small quantity of material. It is easily possible to choose particles whose size and/or composition are such that, on being burnt, they are converted into gas which is trapped in the refractory mass formed or which leaves imprints therein in the form of pores, so as to make it porous and insulating.

Preferably, such porosity-inducing material comprises particles of carbonaceous material. Graphite and urea are examples of such materials which are very suitable for performing the invention, because they are converted into gas without leaving residues which are deleterious for the quality of the insulating refractory mass formed. Another useful carbonaceous product is silicon carbide, in the form of very small particles, whose decomposition gives produces which are compatible with the refractory mass. It is also possible to employ, for example, particles of phenol resin. In this case, the particles of phenol resin are advantageously mixed with particles of magnesia, for example in a proportion of 20%, to avoid a spontaneous and premature combustion of the resin.

When carbon or a carbonaceous product is employed, it is necessary to ensure, of course, that the carbon is burnt as completely as possible, to avoid its being left in the mass which is formed. In fact, if carbon remains in the mass which is formed, the thermal conductivity of the mass will be increased and the thermal insulation properties will therefore be proportionally decreased. In the case of coke or of carbon, special care will be taken to employ particles whose maximum diameter is less than 1 mm, for example particles whose mean diameter is less than 0.5 mm, so that their combustion may be as complete as possible. In the case of the silicon carbide referred to above, particles below 125 $\mu$m will preferably be employed.

In other preferred embodiments of the invention, such porosity-inducing material comprises particles of a material which decomposes to release gas which becomes incorporated in the resulting refractory mass. The use of particles of a material which can decompose to release gas which becomes incorporated in the refractory mass formed on such projection also has the advantage that a large volume of gas in relation to the volume of particulate material will be available for incorporation into the refractory weld mass formed. In such embodiments of the invention, it is preferred that such porosity-inducing material comprises particles of an intumescent material. These particles swell, for example by releasing a gas, such as water vapour, under the effect of heat, and create pores in the mass which is formed. This is highly practical for generating pores of a specific size in the refractory material which is formed and for thus easily obtaining a porous insulating material. The size of the pores can, in fact, be easily controlled by controlling the size of the projected particles. The process may therefore be used for the repair or in situ formation of a porous plug such as one through which gas may be blown into a body of molten steel for various purposes known in that industry.

There are different intumescent materials which may be used in performing the invention and particular mention may be made of materials comprising a hydrated metal salt, especially a hydrated salt of an alkali metal. Examples of appropriate salts are aluminates, such as sodium or potassium aluminate, plumbates, such as sodium or potassium plumbate, stannates, such as sodium or potassium stannate, alums, such as sodium aluminium sulphate or potassium aluminium sulphate, borates such as sodium borate, and phosphates, such as sodium orthophosphate and potassium orthophosphate. Aluminates can be particularly advantageous for forming aluminous or silicoaluminous refractory masses. Perlite, which is an intumescent rock of the rhyolite type, can also be employed.

The said intumescent material advantageously comprises a hydrated alkali metal silicate and preferably a sodium silicate. Sodium silicate has the advantage of being relatively inexpensive.

When a sodium salt is employed, it must be remembered that sodium can appreciably lower the melting point of the refractory material which is formed. The proportion of intumescent material will consequently be adjusted so that the melting point of the mass which is formed is not too close to the maximum operating temperature of the treated wall of the furnace. In the case of a coke oven, for example, this temperature will be preferably above 900° C. and less than 20% of sodium will be employed. Phase diagrams make it possible to predict substantially the melting point of the mass formed.

In yet other preferred embodiments of the invention, such porosity-inducing material comprises hollow or porous particles which become incorporated in the resulting refractory mass. In this way, pores may be introduced into the refractory mass without any decomposition or oxidation of the porosity-inducing material, so reducing any risk that the ceramic welding reactions might be perturbed by the addition of the porosity-inducing material to the ceramic welding powder used. The reaction of formation of the refractory mass can consequently be controlled better and more easily. It is possible, for example, to employ finely divided particles of a volcanic rock, and especially particles of geyserite, optionally pretreated at high temperature, or vermiculite or zeolite particles.

In such embodiments, it is however preferred that at least some of said hollow or porous particles are constituted by the projected refractory particles. Pores can thus be introduced into the mass which is formed by means of an element which is a basic constituent of the refractory mass. These hollow or porous refractory particles preferably have a total porosity of more than 50%. It is surprising that, given the melting of at least a part of the surface of the refractory particles which is needed for the bonding by ceramic welding, the resulting mass should be porous.

Advantageously, at least the greater part by weight of the projected refractory particles are hollow or porous. The pores are thus very numerous and distributed uniformly through the weld mass formed. When this preferred characteristic of the invention is adopted, it is not necessary to add refractory particles other than these porous particles.

In some such preferred embodiments of the invention, such hollow or porous refractory particles comprise porous silica particles or cellular alumina particles. Porous silica particles are obtained, for example, by milling a silica insulating porous refractory brick to obtain particles below 2 mm. Cellular alumina particles can be obtained, for example, by passing alumina powder through a flame. It is particularly surprising that the operation of milling porous bricks can provide particles which retain sufficient pores to form a porous mass. Silica or alumina skeletons may thus be projected and welded together, probably only locally, to form a porous and highly insulating refractory mass.

Alternatively, or in addition, it is preferred that the mixture comprises hollow or porous particles which consist of a vitreous material or of a glass-forming material. These materials are easily available in particle form and are compatible with refractories. It is possible, for example, to employ particles of a vitrifiable composition such as those described and claimed in British Patent GB 2,177,082 (Glaverbel). It is also possible to employ particles capable of being converted into cellular glass bodies by expansion under the effect of heat and obtained by the process described and claimed in British Patent GB 1,556,993.

The said hollow or porous particles advantageously comprise glass microbubbles. Glass microbubbles have a very thin wall. A maximum of gas is thus introduced to form pores with a minimum of material which is foreign to the basic refractory material. It is also possible to control more easily the quantity of gas which is introduced into, or the proportion of pores which are formed in, the refractory mass and to obtain more easily a substantially uniform distribution of the pores in the mass. However, it is highly surprising to introduce hollow glass microbeads into an exothermic reaction at such a high temperature. In fact, glass is relatively fluid at the high temperatures which prevail in the presence of the exothermic reaction. It is therefore particularly astonishing that the glass microbubbles form pores in the final refractory mass, to constitute a porous mass.

The hollow glass microbeads are usually formed from granules of a glass-forming composition based on sodium silicate which may have reacted with some other components such as boric acid. These granules are obtained, for example, by starting with a spray-dried aqueous solution. These granules are vitrified and spherulized in a spherulization furnace. The glass-forming composition contains a substance, for example urea, which gives rise to a release of gas in the spherulization furnace and a cell-forming effect is produced. The glass microbeads can be manufactured in sizes which are particularly suitable for being integrated into the mixture to be projected against the surface to be treated. The glass microbeads may be mono- or poly-cellular.

According to this preferred embodiment of the invention, in which the mixture comprises hollow glass microbeads, at least some of the refractory particles are preferably porous particles and advantageously porous silica particles or cellular alumina particles. This particular combination of porous silica or cellular alumina as refractory material and of glass bubbles as additional pore generator is highly favourable to the production of a porous refractory mass of very low density and providing very high thermal insulation.

In preferred embodiments of the invention, such porosity-inducing particles have a maximum particle size of less than 2 mm and preferably less than 1 mm. Particles which are themselves porous or hollow may be used in sizes up to 2 mm, as desired, to develop the required porosity in the refractory weld mass formed. However in some preferred embodiments, such porosity-inducing particles have a maximum particle size of less than 600 μm. It is recommended to use materials which burn or decompose to evolve gas in sizes less than 600 μm, again depending upon the size and extent of porosity required, because such smaller particle sizes promote completion of the combustion or decomposition reactions which such particles undergo. In yet other preferred embodiments, it is preferred that such porosity-inducing particles have a maximum particle size of less than 200 μm and preferably less than 125 μm. Such smaller upper size limits are particularly appropriate for further promoting complete burning of combustible porosity-inducing material should that be used, and also they limit the quantity of gas generated to promote the formation of a large number of small pores.

The mixture preferably comprises at least 10%, advantageously at least 15%, by weight of such porosity-inducing particles. This proportion promotes the formation of a mass of high porosity, and hence of low density, and exhibiting high thermal insulation properties.

Advantageously, the resulting porous refractory mass has a relative bulk density less than 1.5 and preferably equal to or lower than 1.3. Such relative bulk density values are characteristic of refractory materials having good thermal insulation properties.

It is convenient here to define what is denoted by bulk relative density and porosity, and to indicate methods by which such properties may be measured. Such definitions and methods broadly follow International Standard ISO 5016-1986.

Thus the bulk density is the ratio of the mass of the dry material of a porous body to its bulk volume, expressed in $g/cm^3$, and is numerically equal to the bulk relative density.

The bulk volume of a porous refractory body is the sum of the volumes of the solid material, the open pores, and the closed pores in the body.

It is to be noted that the bulk volume, and hence bulk density, of hollow or porous particles such as may be used to form such a porous refractory body in accordance with the invention are measured in a different manner as will be specified hereinafter.

The true density is the ratio of the mass of the material of the body to its true volume, the true volume being the volume of the solid material in that body.

The apparent porosity of a body is the ratio of the volume of the open pores to the bulk volume of the body, and the true porosity is the ratio of the total volume of the open pores and the closed pores to that bulk volume.

The open pores are those which are penetrated by the immersion liquid in the test specified in ISO 5017, and the closed pores are those which are not so penetrated.

Weighing and measuring methods are as specified in ISO 5016-1986. A single test piece shall be used. In the event that the process of the invention is used for the formation of a porous weld mass which is sufficiently large, a test piece measuring as close as possible to 50×100×100 mm shall be used in order to determine bulk volume. If the porous weld mass is not sufficiently large for such a test piece to be cut, then the weld mass shall be closely wrapped in a thin plastics foil and its bulk volume determined by liquid displacement.

Advantageously, the resulting porous refractory mass has a true porosity of not less than 30%, and preferably a true porosity of not less than 45%. It is especially preferred that the resulting porous refractory mass has an apparent porosity greater than 30%, preferably greater than 37% and a true porosity greater than 50% and preferably greater than 60%. A refractory mass of this kind can exhibit high thermal insulation properties because of its low density and high porosity. Owing to the fact that it is formed at a very high temperature, it also stands up particularly well to use at elevated temperatures.

In the most preferred embodiments of the invention, the fuel comprises one or more of silicon, magnesium, zirconium and aluminium. These elements are capable of being oxidized to form refractory oxides while releasing sufficient heat to produce at least superficial melting of all the usual refractories.

Preferably, the fuel particles have an average size of less than 50 μm and preferably less than 15 μm, a maximum dimension of less than 100 μm and preferably less than 50 μm, and a specific surface greater than 3000 cm$^2$/g. The fuel particles are thus easily oxidized, and this promotes the production of a high temperature in the region of the exothermic reaction, consequently promoting the welding together of the refractory materials through at least superficial melting. The small size of these fuel particles also promotes their complete combustion. The fuel particles are consequently not to be found in the unoxidized state in the mass which is formed, and this makes it easier to obtain a more insulating mass, since the fuel particles employed are generally relative good heat conductors.

The invention extends to a porous refractory mass obtained by the process described above.

DESCRIPTION OF THE PREFERRED EMBODIMENTS

Various preferred embodiments of the invention will now be described by way of example.

EXAMPLE 1

An internal insulating wall must be repaired in a cracking furnace in the petrochemical industry, which has suffered relatively extensive damage, without having to stop the plant. This wall consists of silico-aluminous insulating bricks which have the following composition: 47% SiO$_2$, 38% alumina, 15% lime. The bricks have a relative bulk density of 0.77. The repair consists in forming a refractory mass on the damaged parts of the wall.

To do this, oxygen is projected onto this wall together with a mixture of refractory particles, of finely divided particles of at least one element capable of forming a refractory oxide when being oxidized in an exothermic manner, and of hollow particles. In this embodiment of the invention, the said hollow particles are borosilicate glass microbubbles with a diameter of the order of 25 μm to 125 μm and which have an apparent density of 0.19 g/cm$^3$ (bulk density of the microbubbles measured according to ASTM Standard D3101-72) and an effective density of 0.35 g/cm$^3$ (measured according to ASTM Standard D2840-69). The insulating wall is at a temperature of 1000°–1250° C. The mixture is projected at a rate of 20 kg/hour in a stream of pure oxygen. The mixture has the following composition:

| SiO$_2$ (crushed, dense) | 67% by weight |
|---|---|
| Si | 12% |
| Al | 1% |
| glass microbubbles | 20% |

The silicon particles have an average diameter of 10 μm and a specific surface of 5000 cm$^2$/g. The aluminium particles are flake particles which have a specific surface of approximately 8000 cm$^2$/g. When this mixture is projected onto the hot wall the silicon and aluminium particles burn, releasing sufficient heat to melt at least a part of the surface of the refractory silica particles so that they are locally welded together to form a porous refractory weld mass. These refractory silica particles have a diameter of less than 2 mm with a maximum of 30 to 40% of 1 to 2 mm and a maximum of 15% of less than 100 μm.

The refractory mass formed on the surface of the wall has a total porosity estimated at about 70%, and an apparent porosity, that is the part of the porosity due to the open pores, of approximately 38%. The relative bulk density of this mass is 1.03. This means that the glass microbubbles, or in any case the gas which they contained, have created numerous pores which are uniformly distributed through the refractory mass which is formed and that it has thus been possible successfully to control the resultant porosity. Because of its high porosity, the mass formed has thermal insulating properties which are relatively close to the insulating properties of the treated wall and the repair has thus preserved the properties of the wall. Given that this refractory mass has been formed at a high temperature and that the bond between the refractory particles is a welded bond of a homogeneous type, it stands up well to very high temperature. The post-change, that is to say the deformation undergone by a sample subjected to 1300° C., is less than 1% (the upper permitted limit is 2%). This formed mass adheres perfectly to the treated wall.

By way of variant of this example, the proportion of glass microbubbles in the mixture was varied, the balance being compensated by the proportion of silica particles, and the relative bulk density and the apparent porosity of the mass formed were measured. The following results were obtained (the proportion of silicon and aluminium particles remained identical):

| MIXTURE | | REFRACTORY MASS FORMED | |
|---|---|---|---|
| glass microbubbles | SiO$_2$ | relative bulk density | open porosity |
| 15% | 72% | 1.25 | 33% |
| 10% | 77% | 1.36 | 27% |
| 5% | 82% | 1.5 | 22% |

These results clearly show that it is possible to control the porosity of the refractory mass which is formed with the process according to the invention.

In another alternative form of this example, silicon fuel particles which have an average diameter of the order of 6 μm were employed and, with 20% of glass microbubbles, a refractory mass with a relative bulk density of 0.75 and an open porosity of 46% was obtained.

In yet another alternative form of this example, the glass microbubbles were replaced with particles of vitrifiable material according to British Patent GB 2,177,082 and a porous refractory mass was also obtained.

EXAMPLE 2

It is desired to insulate a part of the surface of an internal wall of the vault of a coke plant oven without having to stop the plant. The objective of this operation is to protect a metal structure situated behind this wall, to which access is impossible for protecting it directly. This wall is a conventional refractory wall consisting of more than 94.5% silica and with an apparent porosity of less than 22%. The procedure is the same as in Example 1, except that in this example of embodiment of the invention, the particles which are employed are converted at least partially into gas in the conditions of the exothermic reaction. They are coke particles which have a diameter of between 0 and approximately 500 μm. The treated surface of the refractory wall is at a temperature of 800° to 1100° C. The mixture is projected in a stream of pure oxygen. The mixture has the following composition:

| $SiO_2$ | 67% by weight |
|---|---|
| Si | 12% |
| Al | 1% |
| Coke | 20% |

The aluminium fuel particles and the crushed, dense $SiO_2$ refractory particles have the same characteristics as in Example 1. The silicon fuel particles have an average diameter of 6 μm and a specific surface of 5000 $cm^2/g$.

The refractory mass formed on the surface of the refractory wall has an apparent porosity (due to the open pores) of approximately 44% and a relative bulk density of 1.17. The coke particles yield gaseous combustion products under the effect of the heat released by the exothermic reaction, and this gas has created numerous pores which are uniformly distributed through the refractory mass which is formed. Some of these pores have remained closed with the gas occluded in the mass, while a relatively high proportion of the pores is open. With the process according to the invention it is thus possible successfully to generate a controlled porosity, with the additional benefit of the advantages of the ceramic welding technique. This formed mass adheres well to the treated wall and the deformation undergone by a sample subjected to 1500° C. is less than 0.5%. Because of its high porosity, the mass formed has very high thermal insulation properties. As a result, the external temperature of the vault wall in the treated region is markedly less high and the metal structure runs a lower risk of reaching the distortion temperature of the metal.

By way of alternative form of this example, 20% of SiC particles are employed as a replacement for the coke particles. These particles have a diameter of less than 125 μm. A refractory mass is obtained whose apparent porosity is approximately 42.5% and whose relative bulk density is 1.26, the deformation undergone by a sample subjected to 1500° C. being less than 0.2%.

EXAMPLE 3

An insulating refractory mass is to be formed on the surface of an inner wall of a glass-making furnace without having to stop the plant. This wall is a refractory wall made of sillimanite. The procedure is the same as in Example 1, except that in this embodiment of the invention porous refractory particles are employed to induce porosity in the resulting weld mass. These are porous silica particles obtained by milling insulating porous silica bricks, the relative bulk density of the insulating bricks being 0.95. The particles have been crushed and screened so as to obtain a particle size range similar to the particle size range of the nonporous $SiO_2$ particles of Example 1. The treated surface of the refractory sillimanite wall is at a temperature of approximately 800° C. The mixture is projected in a stream of pure oxygen. The mixture has the following composition:

| porous $SiO_2$ | 87% by weight |
|---|---|
| Si | 12% |
| Al. | 1% |

The aluminium and silicon fuel particles have the same characteristics as in Example 2.

The refractory mass formed on the surface of the refractory wall has an apparent porosity (due to the open pores) of approximately 38% and a relative bulk density of 1.30. The porous $SiO_2$ particles have therefore reconstituted a porous mass. This mass which is formed adheres well to the treated wall and the deformation undergone by a sample subjected to 1300° C. is less than 0.5%. Because of its high porosity, the mass formed has very high thermal insulation properties. Its conductivity at 200° C. is about 0.5 $W.m^{-1}.K^{-1}$.

By way of an alternative form of this example, glass microbubbles are added to the projected mixture. These particles have the same characteristics as the glass microbubbles of Example 1. The mixture has the following composition:

| porous $SiO_2$ | 77% by weight |
|---|---|
| Si | 12% |
| Al | 1% |
| glass microbubbles | 10% |

The aluminium and silicon fuel particles have the same characteristics as in Example 1.

A refractory mass is obtained, whose apparent porosity is approximately 32% and whose relative bulk density is 1.24. It is found that a slightly less dense mass is obtained, which therefore has a higher total porosity, with a slightly lower apparent porosity, which means that a higher proportion of the pores is closed. This is advantageous for the thermal insulation of the refractory wall.

By way of further alternative forms, porous refractory masses according to this example of embodiment of the invention were formed on refractory walls of cordierite and of chamotte, similar results being obtained.

EXAMPLE 4

A mixture composed of crushed, dense $SiO_2$ particles, of silicon and aluminium fuel particles and of particles of an intumescent material is projected onto the surface of a refractory silica wall at a temperature of 800° to 1100° C. In this example the intumescent material consists of dry hydrated sodium silicate (26% by weight of water). The mixture is projected in a stream of pure oxygen. It has the following composition:

| $SiO_2$ | 72% by weight |
|---|---|
| Si | 12% |
| Al | 1% |
| hydrated sodium silicate | 15% |

The silicon and aluminium particles have an average diameter and a specific surface which are similar to those mentioned in Example 1. The particles of intumescent material have a size of the order of 150 μm and are obtained by the process of drying on a support which moves in a cyclic manner, described in British Patent GB 2,155,852. The projection of this mixture onto the hot refractory wall gives rise to a porous and well-adherent refractory mass. The intumescent material develops pores in the mass under the effect of the temperature.

By way of alternative form, a similar porous refractory mass was formed on the surface of an aluminous refractory wall by replacing the sodium silicate with sodium aluminate and the silica with alumina.

What is claimed is:

1. A composition of matter which is a powder mixture for use in a process of forming a porous refractory mass on a surface, the composition comprising:
   (a) refractory particles;
   (b) fuel particles which are capable of reacting exothermically with an oxidizing gas to form at least one refractory oxide and which are present in a quantity effective to release, on projection together with the oxidizing gas, sufficient heat to melt at least the surfaces of the refractory particles so that the refractory particles and at least some of the at least one refractory oxide bond together; and
   (c) particles or porosity-inducing material comprised of at least one of hollow and porous particles which become incorporated in the refractory mass formed on projection and which have at least one of a composition and a particle size selected so that incorporation of the porosity-inducing material in the powder mixture results in the formation of porosity within the refractory mass formed on projection.

2. The composition according to claim 1, wherein at least some of the at least one of hollow and porous particles are refractory particles.

3. The composition according to claim 1, wherein the at least one of hollow and porous particles of the particles of porosity-inducing material (c) are present in an amount by weight which is greater than that of the refractory particles (a).

4. The composition according to claim 2, wherein the at least one of hollow and porous refractory particles comprise at least one of porous silica particles and cellular alumina particles.

5. The composition according to claim 1, wherein the at least one of hollow and porous particles consist of one of a vitreous material and a glass-forming material.

6. The composition according the claim 5, wherein the at least one of hollow and porous particles comprise glass microbubbles.

7. The composition according to claims 1, wherein the porosity-inducing material has a maximum particle size of less than 1 mm.

8. The composition according to claim 7, wherein the porosity-inducing materials have a maximum particles size of less than 600 μm.

9. The composition according to claim 7, wherein the porosity-inducing material has a maximum particle size of less than 200 μm.

10. The composition according to claim 1, wherein the powder mixture comprises at least 10% by weight of the porosity-inducing material.

11. The composition according to claim 1, wherein the fuel particles comprise at least one of silicon, magnesium, zirconium and aluminum.

12. The composition according to claim 1, wherein the fuel particles have an average size of less than 15 μm, a maximum dimension of less than 50 μm, and a specific surface greater than 3000 cm$^2$/g.

13. The composition according to claims 9, wherein the porosity-inducing material has a maximum particle size of less than 125 μm.

14. The composition according to claim 10, wherein the powder mixture comprises at least 15% by weight of the porosity-inducing material.

* * * * *